Feb. 12, 1952　　　　S. ZENTECKI　　　　2,585,206
BRAKE POSITION CONTROLLED SWITCH
Filed Sept. 28, 1950　　　　　　　　　　　　2 SHEETS—SHEET 1
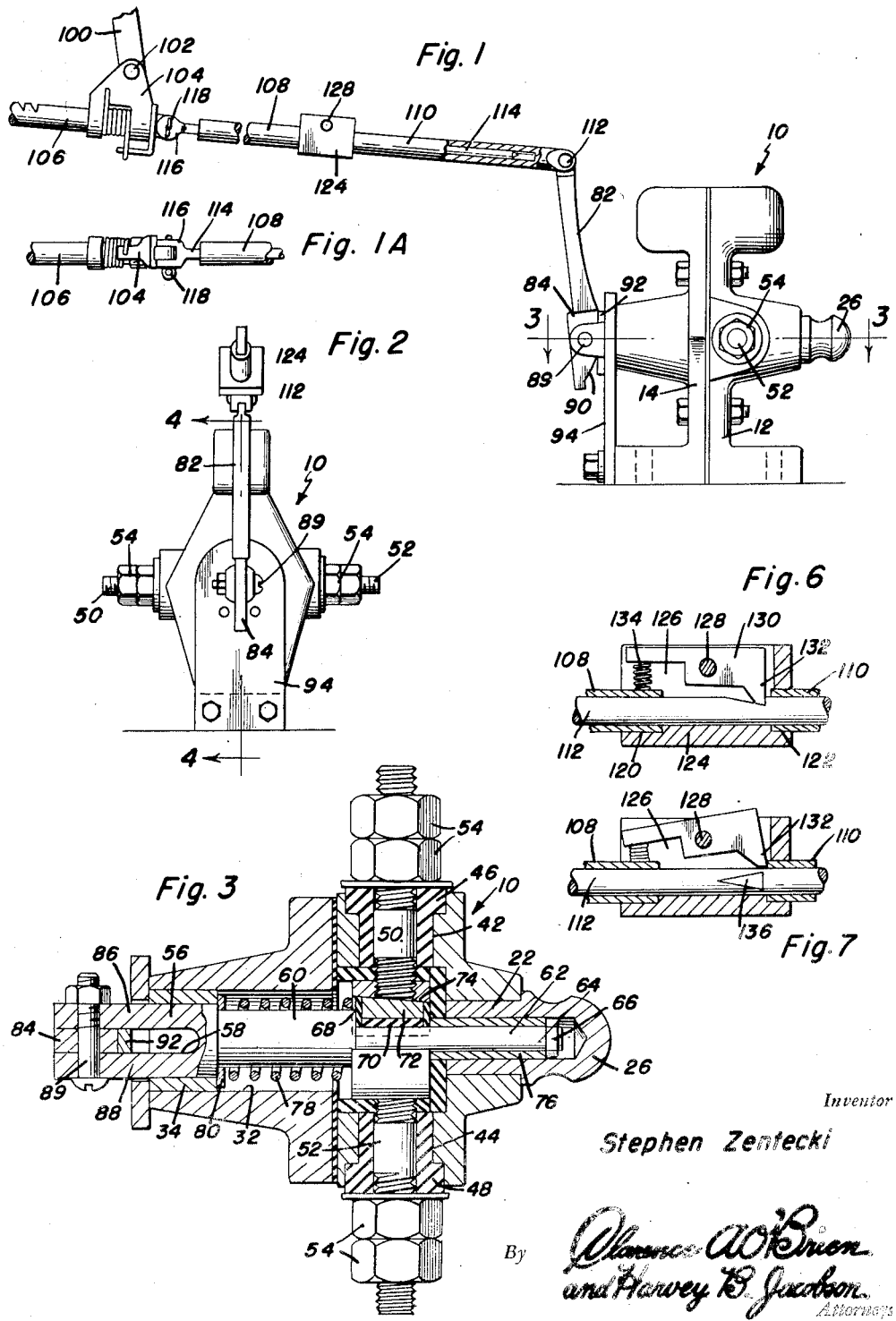
Inventor
Stephen Zentecki

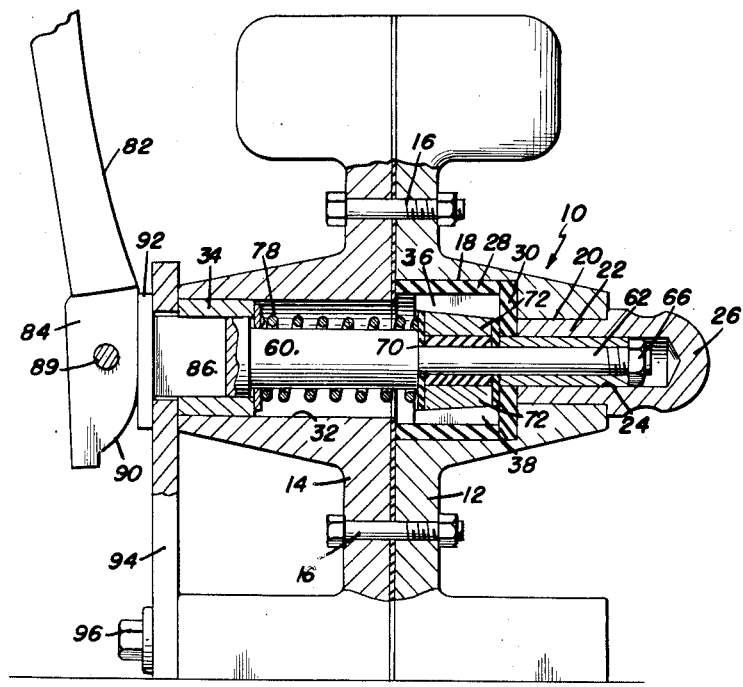
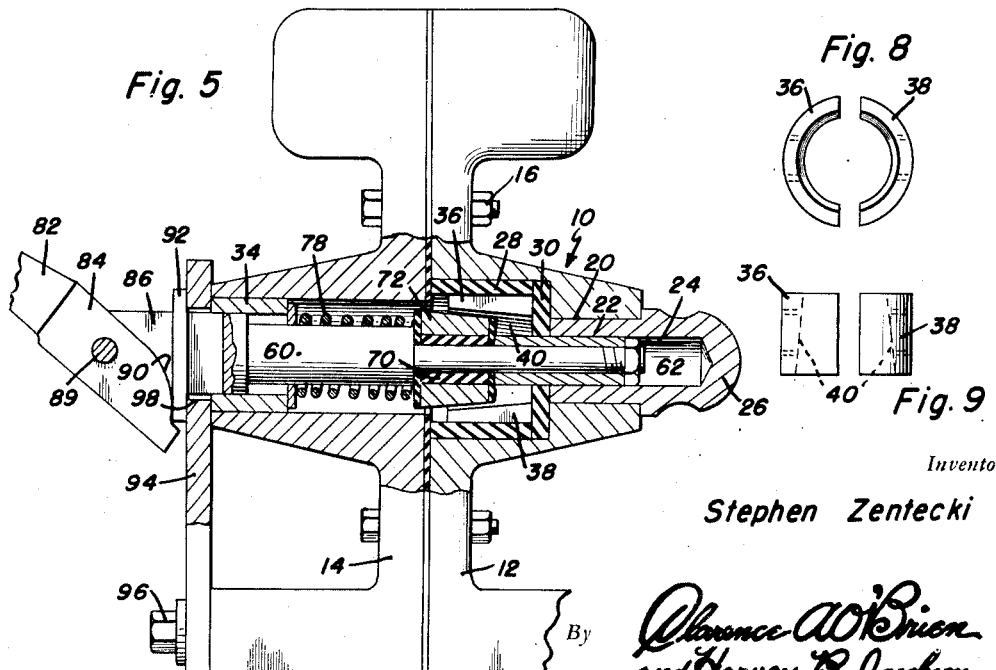
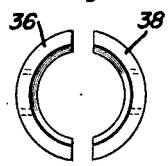
Inventor
Stephen Zentecki

Patented Feb. 12, 1952

2,585,206

UNITED STATES PATENT OFFICE 2,585,206

BRAKE POSITION CONTROLLED SWITCH

Stephen Zentecki, South Dayton, N. Y.

Application September 28, 1950, Serial No. 187,215

2 Claims. (Cl. 200—59)

This invention comprises novel and useful improvements in a brake position controlled switch and more specifically appertains to a safety device attachment adapted to be connected with the emergency brake actuating rod of motor vehicles for rendering certain vital electrical circuits of the vehicle inoperative when the hand brake of the vehicle is applied.

The primary object of the invention is to provide a safety attachment for controlling vital electric circuits of motor vehicles and the like and which shall be capable of automatically rendering such vital electrical circuits inoperative when the emergency brakes of the vehicle are applied, and to thereby minimize any fire hazards.

A further object of the invention is to provide an attachment in conformity with the preceding object which shall be capable of adjustment to permit the vital electrical circuit to remain operative even though the emergency brakes have been set.

Still another important object of the invention is to provide an attachment having a novel operative connection with the emergency brake actuating rod of certain types of motor vehicles to permit the selective operation or inoperation of the attachment in response to actuation of the actuating rod.

And a final important object of the invention to be specifically enumerated herein, resides in the provision of a safety device or attachment as set forth in the foregoing objects which shall have an improved and highly effective and serviceable electric switch mechanism incorporated therein.

These, together with various ancillary features and objects of the invention, which will later become apparent as the following description proceeds, are attained by the present invention, a preferred embodiment of which has been illustrated, by way of example only, in the accompanying drawings, wherein:

Figure 1 is a fragmentary side elevational view showing one suitable embodiment of the attachment incorporating therein the principles of this invention, the same being shown connected to a portion of a vehicle emergency brake actuating mechanism, parts being broken away and shown in section;

Figure 1a is a bottom plan view of a part of the operative connection of the attachment to the actuating rod of the hand brake of Figure 1;

Figure 2 is an end elevational view of the switch member and a part of its actuating mechanism, taken from the left of Figure 1;

Figure 3 is a horizontal sectional view taken substantially upon the plane indicated by the section line 3—3 of Figure 1 and showing certain details of the internal construction of the switch member of the device;

Figure 4 is a vertical sectional view, taken substantially upon the plane indicated by the section line 4—4 of Figure 2;

Figure 5 is a view similar to Figure 4 but showing the parts of the switch mechanism in a different position during their operation;

Figures 6 and 7 are sectional detail views through a portion of the connecting mechanism by which the switch is operatively associated with the actuator rod of the emergency brake of the vehicle, Figure 6 showing the position of the parts when the switch is rendered operative by the brake actuator rod and Figure 7 indicating the position of the parts when the switch mechanism is not operatively connected to the brake actuator rod; and Figures 8 and 9 are respective end and top elevational views of the stationary contact members of the switch assembly of the invention.

Referring now more specifically to the accompanying drawings, wherein like numerals designate similar parts throughout the various views, attention is directed first to the construction of the switch member of the attachment as disclosed best in Figures 3–5.

The switch member, designated generally by the numeral 10, consists of a casing of any suitable material and construction, and which has complementary sections 12 and 14 which are joined and detachably connected together upon mating plane surfaces as by fastening bolts 16.

Chambers are formed in the complementary sections as set forth hereinafter to receive the switch contacts and their associated operating mechanism. Thus, the section 12 has a relatively large cylindrical chamber 18 which opens towards and through that surface of the section 12 which is adapted to be secured against a corresponding surface of the section 14. Opening from the other end of the casing section 12 and communicating with the chamber 18, is an axially disposed cylindrical bore 20 of relatively smaller diameter. Slidably received in the bore 20 is a hollow, tubular bushing 22 whose internal cylindrical bore 24 constitutes a journal bearing as set forth hereinafter, this bushing being closed at its outer end as by a rounded integral head portion 26. A cylindrical insulating bushing 28 is received within the chamber 18 and has one end flush with the open end of this chamber, while the other end abuts against an insulating washer 30 positioned at the bottom of this chamber and abutted against the end of the bushing 22.

The other casing section 14 is provided with a cylindrical chamber 32 whose open end communicates with the interior of the chamber 18 as illustrated, and whose other end, extending completely through the section 14, receives therein a cylindrical sleeve or bushing 34.

A pair of stationary electrical contacts, whose construction is shown in Figures 8 and 9, is housed within the chamber 18 of the section 12. These contacts, of any suitable electrically conductive material such as bronze, copper or the like, comprise segments of a cylinder, consisting of complementary portions 36 and 38 having a cylindrical exterior adapted to be received against the cylindrical interior surface of the insulating sleeve 28. The portions 36 and 38 are maintained in position within the cylindrical sleeve of insulating material with their ends in evenly spaced relation to each other by a means to be subsequently set forth. The interior surface of the portions 36 and 38 have conical contact or bearing surfaces 40, which operate in a manner to be subsequently set forth. Referring now more particularly to Figure 3, it will be seen that the casing section 12 upon diametrically opposite sides of the same, is provided with aligned bores or passages 42 and 44 in which are received insulating bushings 46 and 48 through which are positioned terminally threaded studs 50 and 52. At their outer ends, these studs are provided with the customary nuts 54 by means of which electric conductors may be secured to the ends of the studs. At their inner ends, the screw threaded studs extend through apertures in the insulating sleeve 28, and are connected with the segments 36 and 38 by means of internally threaded bores or recesses therein as shown in Figure 3.

As will be readily understood, the studs 50 and 52 thus constitute binding posts which are connected to electric conductors forming a part of any desired vital electrical circuit of a vehicle or the like, so that the energization of the circuit will be controlled by an electrical contact established between the contact members 36 and 38 as set forth hereinafter.

In order to control the circuit through the segments 36 and 38, there is provided a movable switch contact assembly. This assembly consists of a plunger having an outer end portion 56 which is slidably received in the bushing 34, and which thus extends through the side of the casing section 14 as shown in the drawings. This extending end of the end portion 56 is slotted or bifurcated as at 58, by means of which the switch actuator may be connected thereto. Immediately adjacent the end portion 56, the plunger is provided with a diametrically reduced portion 60 which extends through the chamber 32 and into the adjacent chamber 18 of the section 12. The other end of the plunger is provided with a diametrically reduced axial extension or rod 62 which at one end is integrally formed upon the portion 60, and at its other end is externally threaded as at 64 for the reception of a fastening nut 66. There is thus provided a shoulder where the portion 62 joins the portion 60, and seated upon the portion 62 and abutted against such shoulder is an electrically insulating washer 68 together with an electrically insulating sleeve 70, and an electrically conducting movable switch contact 72 having an axial cylindrical bore therein for embracing the cylindrical insulating sleeve 70 is seated thereon. The movable contact 72 is provided with a conical exterior surface 74 which is complementary to the conical surfaces 40 of the stationary contacts. A sleeve or bushing 76 surrounds the outer end of the portion 62 and by means of the fastening nut 66 bears against the movable contact 72 and the insulating sleeve 70 to retain these members tightly against the insulating disk 68 and the shoulder above mentioned.

It will thus be apparent that the stationary contacts have concave conical electrically conducting surfaces, while the movable contact 72 has a convex conical complementary electrically conducting surface adapted to be slidably received in the concave surfaces of the portions 36 and 38. A resilient means in the form of a compression spring 78 encircles the portion 60 of the plunger and bears against a washer or spring seat 80 engaging the end of the sleeve or bushing 34, and against the above mentioned washer 68. This spring normally urges the plunger inwardly of the casing to cause the movable contact to be received within and seated within and have electrically connecting relation with the portions 36 and 38 of the stationary contact member.

When the plunger is moved to its inward position by the spring, it will be apparent that the electrical circuit through the binding posts 50 and 52 is completed so that the vital electrical circuit controlled by the switch member is energized or operative insofar as this switch is concerned. However, when the plunger is withdrawn against the opposition of the spring 78 it will be apparent that this electrical circuit is broken by the withdrawal of the movable contact from the stationary contacts to thereby interrupt or break this vital electrical circuit.

In accordance with this invention, it is preferred to operate this plunger for breaking the circuit by a connecting means attached to the emergency brake actuator of the vehicle.

The direct actuating means of the plunger preferably consists of a switch actuating lever 82 having its terminal portion 84 pivoted between the furcations 86 and 88 of the bifurcated end portion 56, by means of a pivot bolt 89. The terminal portion 84, however, is provided with a cam surface 90 which is adapted to rub against an abutment plate 92 which is mounted upon an upstanding support 94 secured as by a bolt 96 to the casing section 14. As will be apparent, the upstanding plate 94 is apertured as at 98 to receive the bifurcated end of the plunger, this plate bearing against the adjacent end of the bushing 34 and the adjacent end of the casing section 14. The abutment plate 92 carried by the member 94 extends through the slot 58 of the bifurcated portion of the plunger portion 56 and serves both to prevent rotation of the plunger during its sliding movement, and also constitutes an abutment adapted to be engaged by the cam surface 90.

It will thus be seen that when the lever 82 is oscillated on its pivot pin 89, the action of the cam surface 90 upon the abutment plate 92 will selectively move the plunger outwardly of the switch casing against the opposition of the spring 78 to thereby open the switch; or will permit the spring to urge the plunger inwardly to close the switch.

A conventional form of emergency hand brake actuating means such for example as that for use in the well known Ford and Mercury automobiles, consists of a supporting link 100 which is attached to the underside of the dash of the vehicle, and at the lower end of which is pivoted as at 102, a journal bracket 104 which slidably receives one end of a brake actuator rod 106. In this well known form of brake actuator, the rod 106 is connected to the emergency brakes of the vehicle, in a manner not shown but well known, so that the rod 106 is capable of both axial, longitudinal movement and rotational movement about its longitudinal axis. The longitudinal movement is employed to apply or release the brakes, while the rotational movement serves to engage or release the retaining means by which the emergency brakes are locked in their adjusted and applied position.

In connecting this brake actuator rod 106 to the switch lever 82, it will thus be apparent that it is necessary to provide a connection which will accommodate itself to both the axial longitudinal movement and the rotational movement. The present invention utilizes a novel connecting means which makes use of both the rotational and longitudinal movement to properly manipulate the switch member.

Thus, there is provided a connection consisting of a pair of aligned outer tubular sections 108 and 110, the latter being pivotally connected as at 112 to the upper end of the switch lever 82, so that the section 110 can pivot about its pin 112 but cannot rotate about its longitudinal axis. The aligned sections 108 and 110 are telescopingly received upon an inner section 114 in the form of a rod having an eye portion 116 at its outer end which is bifurcated and engaged and attached to the end of the brake actuating rod 106 as by a cotter pin or the like 118. It will thus be apparent that the rod 114 is capable of both axial longitudinal sliding movement and rotational movement in accordance with the motion imparted to the brake actuator rod 106.

As shown best in Figures 6 and 7, the adjacent ends of the tubular sections 108 and 110 of the outer telescoping members are spaced from each other by a certain fixed distance. The adjacent ends of these outer sections are fixedly secured as by welding or the like into bores 120 and 122 disposed in opposite ends of a connector body 124. The connector body includes a chamber 126 in which is pivotally mounted as upon a pivot pin 128, a lever 130 provided at one end with a dog 132 and at its other end engaged by a compression spring 134 which may be suitably anchored between the end of the lever 130 and the end of the tubular section 108, as shown. A convenient portion of the rod 112 slidably received in the connector body 124, is provided with a depression or notch 136 upon one side of the rod.

As will now be apparent from Figures 6 and 7, when the rod 112 is properly rotationally adjusted, the notch 136 can be caused to register with the dog 132 whereby the spring 134 will cause the dog to engage the shouldered notch so that when the brake actuator rod 106 is moved longitudinally towards the left as viewed in Figures 1, 6 and 7, the shouldered portion of the notch 136 will engage the dog 132 and through the dog which is pivoted to the connector body 124, will move the section 110 likewise towards the left and thereby will actuate the switch lever 82 in a counterclockwise rotation, causing the cam of the same to move the switch plunger to switch opening position as above set forth. However, it is also possible, as shown in Figure 7, to rotate the brake actuator rod 106 and consequently the rod 112 to cause the recess 136 to move out of registry with the dog 132 so that the longitudinal movement of the brake actuator rod 106 will be ineffective to move the tubular member 110 and consequently the switch lever 82 since the dog will smoothly slide over the surface of the rod 112 and will not be actuated by the same.

From the foregoing, it will be apparent there has been provided a connection between the switch and the brake actuator rod which enables the user to operatively connect the switch lever to the actuator rod for movement in synchronization therewith to break and make the contact through the switch for the vital electrical circuit as the emergency brakes are applied or released. Alternatively, the operator by first rotating the brake actuator rod 106 to a predetermined position, is enabled to apply or release the brakes without affecting this movement of the switch lever 82, and consequently without breaking the vital electric circuit controlled by this switch member.

It will also be appreciated from the foregoing that the device set forth hereinbefore, materially assists in protecting the motor vehicle against the danger of fires arising from shorted electrical circuits, by breaking such circuits automatically upon applying the brake.

It will be further understood that a lock could be incorporated into the brake handle, as in the manner of a lock built into an automobile door handle, which will permit the operator of the vehicle locking the same against use by unauthorized persons.

It will be readily understood that the present invention provides a safety device which may be readily applied to certain existing types of emergency brake actuating mechanism and which will be capable of breaking any selected vital electrical circuit of a vehicle when the emergency brake of the same has been applied.

From the foregoing, the construction and operation of the device will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having described the invention, what is claimed as new is:

1. A safety device for controlling electric circuits vital to the operation of a motor vehicle and its engine comprising a switch having fixed and movable contacts adapted to control a vital electric circuit, a cam connected to said switch for operating the same, a switch lever connected to said cam, a brake actuator for a motor vehicle including an actuator rod having both reciprocatory and rotary motion, means connecting said actuator rod and said switch lever for actuation of the latter by the former to break the vital electric circuit when the actuator rod is moved in one direction while in a first predetermined rotary position and for operatively disconnecting the former from the latter to allow the vital electric circuit to remain energized when the actuator rod is moved in said one direction while in another predetermined rotary position, said connecting means comprising a pair of telescoping relatively slidable and rotatable members, the outer member being non-rotatably secured to said switch lever, the inner member being secured to said brake actuator rod for rotary and reciprocatory movement therewith, a clutch means engaging said telescoping members for actuation of the outer member by the inner member upon movement of the latter in one direction while in a predetermined rotational position with respect to the outer member.

2. A safety device for controlling electric circuits vital to the operation of a motor vehicle and its engine comprising a switch having fixed and movable contacts adapted to control a vital electric circuit, a cam connected to said switch for operating the same, a switch lever connected to said cam, a brake actuator for a motor vehicle including an actuator rod having both reciprocatory and rotary motion, means connecting said actuator rod and said switch lever for actuation of the latter by the former to break the vital electric circuit when the actuator rod is moved in one direction while in a first predetermined rotary position and for operatively disconnecting the former from the latter to allow the vital electric circuit to remain energized when the actuator rod is moved in said one direction while in another predetermined rotary position, said connecting means comprising a pair of telescoping relatively slidable and rotatable members, the outer member being non-rotatably secured to said switch lever, the inner member being secured to said brake actuator rod for rotary and reciprocatory movement therewith, a clutch means engaging said telescoping members for actuation of the outer member by the inner member upon movement of the latter in one direction while in a predetermined rotational position with respect to the outer member, said clutch means comprising a shouldered recess on said inner member, a dog pivoted on the outer member and engageable in said recess.

STEPHEN ZENTECKI.

REFERENCES CITED

The following references are of record in the file of this patent:

UNITED STATES PATENTS

| Number | Name | Date |
|---|---|---|
| 1,952,153 | Young | Mar. 27, 1934 |
| 2,133,545 | Krieger | Oct. 18, 1938 |
| 2,274,990 | Mildebrath | Mar. 3, 1942 |
| 2,305,983 | Muth | Dec. 22, 1942 |
| 2,343,394 | Blomberg | Mar. 7, 1944 |